United States Patent
Oshima et al.

(10) Patent No.: US 9,229,450 B2
(45) Date of Patent: Jan. 5, 2016

(54) AUTONOMOUS MOVEMENT SYSTEM

(75) Inventors: Akira Oshima, Tokyo (JP); Kenjiro Yamamoto, Tokyo (JP); Yukihiko Ono, Tokyo (JP); Yoshitaka Hara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 101 days.

(21) Appl. No.: 14/119,312

(22) PCT Filed: May 31, 2011

(86) PCT No.: PCT/JP2011/062509
§ 371 (c)(1),
(2), (4) Date: Nov. 21, 2013

(87) PCT Pub. No.: WO2012/164691
PCT Pub. Date: Dec. 6, 2012

(65) Prior Publication Data
US 2014/0095009 A1    Apr. 3, 2014

(51) Int. Cl.
*G05D 1/02* (2006.01)
*G06F 19/00* (2011.01)

(52) U.S. Cl.
CPC .............. *G05D 1/021* (2013.01); *G05D 1/0238* (2013.01); *G05D 1/0274* (2013.01); *G05D 2201/0206* (2013.01); *Y10S 901/01* (2013.01)

(58) Field of Classification Search
CPC ......... G05D 1/02; G05D 1/021; G01C 21/00; G01S 2205/00
USPC ...................... 701/23, 300, 301; 340/903, 435
See application file for complete search history.

(56) References Cited

U.S. PATENT DOCUMENTS

| | | | |
|---|---|---|---|
| 6,064,926 A * | 5/2000 | Sarangapani et al. | 701/26 |
| 6,751,535 B2 * | 6/2004 | Mori | 701/23 |
| 2001/0021888 A1 * | 9/2001 | Burns et al. | 701/23 |
| 2009/0043440 A1 | 2/2009 | Matsukawa et al. | |
| 2010/0324771 A1 * | 12/2010 | Yabushita et al. | 701/25 |
| 2011/0288714 A1 * | 11/2011 | Flohr et al. | 701/27 |
| 2012/0035788 A1 * | 2/2012 | Trepagnier et al. | 701/3 |

FOREIGN PATENT DOCUMENTS

| | | |
|---|---|---|
| JP | 3-278106 A | 12/1991 |
| JP | 2000-20127 A | 1/2000 |
| JP | 2008-65755 A | 3/2008 |
| JP | 2009-42845 A | 2/2009 |
| JP | 2009-110495 A | 5/2009 |
| JP | 2010-55498 A | 3/2010 |
| JP | 2010-282443 A | 12/2010 |
| JP | 2011-8313 A | 1/2011 |

* cited by examiner

*Primary Examiner* — Tan Q Nguyen
(74) *Attorney, Agent, or Firm* — Baker Botts L.L.P.

(57) ABSTRACT

A route decision system is provided to avoid an obstacle existing in a traceably moving direction for tracing a reference route from a current location of an autonomous movable body. The system computes traffic distance and a traffic width as a traffic region having a given traffic width and does not allow an obstacle to intrude in each of a plurality of moving The moving direction of the autonomous movable body is decided on the basis of the traceably moving direction and the traffic region. A speed decision device decides a moving speed allowing the autonomous movable body to stop before it collides with the obstacle in response to the braking condition of the autonomous movable body and the location and the speed of the obstacle.

10 Claims, 4 Drawing Sheets

AUTONOMOUS MOVEMENT SYSTEM

TECHNICAL FIELD

The present invention relates to an autonomous movement system of an autonomous movable body autonomously running through a specified reference route on a map with a self-location estimated.

BACKGROUND ART

As a background art in the technology field, there is Japanese Published Unexamined Application No. 2011-8313 (Patent Literature 1). Patent Literature 1 aims at running through a route so as to trace the route and avoid an obstacle. For the purpose, a trafficable distance allowing straight-running within a specific traffic width is computed for each of given angular intervals in the circumference of a vehicle and, in the directions where the trafficable distance is not less than a set threshold value, a direction the difference of which from a target direction is the minimum is decided as the traveling direction of the vehicle. Further, the speed of the vehicle is decided from the maximum value and the average value of the trafficable distance and the magnitude of route deviation. An autonomous movement system moving in this way is disclosed in Patent Literature 1.

Further, there is Japanese Published Unexamined Application No. 2010-282443 (Patent Literature 2). Patent Literature 2 aims at running through a route the direction of which does not largely vary when an obstacle is avoided. For the purpose, a detour point is set within a given angle from the current direction of a vehicle. Further, the distance from an obstacle is decreased in the case of a fixed obstacle described on a map and increased in the case of an undescribed obstacle. An autonomous movement system moving in this way is disclosed in Patent Literature 2.

Furthermore, there is Japanese Published Unexamined Application No. 2009-42845 (Patent Literature 3). Patent Literature 3 aims at detecting an obstacle laterally approaching and controlling speed at an intersection while deceleration is prevented from occurring by detecting a lateral wall on an ordinary path. For the purpose, a semi-elliptical deceleration region is formed ahead of a vehicle on an ordinary path, the deceleration region is changed into a semicircular shape and switched so as to expand laterally in an intersection zone described on a map, thereby a lateral obstacle is detected at an intersection, and speed is controlled. An autonomous movement system moving in this way is disclosed in Patent Literature 3.

CITATION LIST

Patent Literature

Patent Literature 1: Japanese Published Unexamined Application No. 2011-8313
Patent Literature 2: Japanese Published Unexamined Application No. 2010-282443
Patent Literature 3: Japanese Published Unexamined Application No. 2009-42845

SUMMARY OF INVENTION

Technical Problem

A problem of the present invention is, in an environment of a facility or a town where an object such as a pedestrian or an obstacle exists, to materialize an autonomous movement system always having both safety and swiftness even in a narrow path or in a large space when a vehicle runs autonomously through a reference route specified on a map with a self-location estimated.

In the case of assuming an autonomous movable body of an electrical wheelchair for example, it is desirable to materialize a vehicle that makes it possible to weave at a safe speed in a narrow space and run at a high speed apart from ambient pedestrians in order to secure safety in a large space. It is further desirable to run at a speed at which a vehicle can stop always before collision occurs in consideration of the moving speed of a pedestrian even in the case where the pedestrian approaches.

From such a requirement, in the system of Patent Literature 1, a trafficable distance is computed in each of directions around a vehicle at one traffic width and a route is decided. When the traffic width is set to narrow however, although it is possible to go through a narrow path, the vehicle goes through a path close to an obstacle also in a large space and it is impossible to run at a high speed apart from an ambient pedestrian in order to secure safety in a large space, which is a problem of the present invention. In contrast, when the traffic width is set to widen, it is possible to go through a route apart from an obstacle in a large space but it is impossible to go through a narrow path.

In order to solve the above problem of the present invention therefore, it is necessary to change the traffic width of a running route of a vehicle in response to the size of a space and it is also necessary to change a speed in response to the occasion of going through a narrow path or the situation of a moving obstacle.

In the system of Patent Literature 2, since a route is decided by decreasing the size of a hazardous region in the case of a fixed object described on a map, it is possible to go through a narrow space when an existing obstacle is only a fixed object described on a map. Since the hazardous region set for an obstacle other than the fixed object described on a map takes a single value however, a vehicle runs through a route similar to Patent Literature 1 in the case of an unknown obstacle.

In order to solve the above problem of the present invention therefore, it is necessary to change a traffic width in response to the size of a space regardless of whether it is described on a map or not.

In contrast, in the system of Patent Literature 3, at an ordinary path and an intersection described on a map, the shape of an obstacle detection region is changed so as to be a semi-elliptical shape in the case of an ordinary path and a semicircular shape in the case of an intersection and a speed is decided. As a result, it is possible to: run at a high speed even when an obstacle such as a lateral wall exists on an ordinary path described on a map; and detect a lateral obstacle and reduce a speed at an intersection zone described on a map.

In order to solve the above problem of the present invention however, a detection region allowing a vehicle to stop even when an obstacle not described on a map runs out is necessary and the detection region of an obstacle is not a simple shape such as a semi-elliptical shape or a semicircular shape but has to be decided by the physical relationship of the detection location of an obstacle, a speed at which an obstacle can move, and the speed and breaking performance of a vehicle.

Further, in order to secure swiftness and safety which are the above problems of the present invention, it is necessary to: decide the speed of a vehicle in accordance with on-site situation; and carry out the process of deciding the route (moving direction) of the vehicle separately from the process of deciding a moving speed.

In order to design a route of a vehicle allowing the traffic of a narrow path, safety, and swiftness, it is necessary to: make the traffic of a narrow path possible by searching a route while the traffic width of the vehicle is regarded as narrow in an environment where narrow paths and obstacles gather; and move through a site safely and swiftly by searching a route apart from an obstacle while the traffic width of the vehicle is regarded as wide in a wide environment where an obstacle is remotely located. Further, in order to materialize swiftness, it is necessary to design a route that does not bend, is not blocked by an obstacle or the like, and can be long-reach.

In order to design the speed of a vehicle allowing the traffic of a narrow path, safety, and swiftness, a method of decelerating a speed to the minimum necessity in consideration of the breaking condition of the vehicle in response to the location and speed of an obstacle is necessary. By the method, it is possible to decrease a speed sufficiently and run safely even on a narrow path.

An object of the present invention is to provide an autonomous movement system allowing to go through a narrow path safely and swiftly by carrying out independently the design of a route where the traffic width of an autonomous movable body is variable and the design of a speed considering the breaking condition of a vehicle and the movement of an obstacle.

Solution to Problem

The above object can be attained by an autonomous movement system having an environmental information acquisition means to acquire environmental information around an autonomous movable body, a memory information processing means to retain map information where a reference route is registered, a self-location estimation means to estimate the self-location of the autonomous movable body on the basis of the environmental information and the map information, an obstacle detection means to detect information on an obstacle on the basis of the environmental information, a route decision means to decide a moving direction on the basis of the self-location, the information on the obstacle, and information on the reference route, a speed decision means to decide a moving speed on the basis of the obstacle information, and a vehicle control means to control the movement of the autonomous movable body on the basis of the moving direction and the moving speed, wherein: the route decision means, in order to avoid the obstacle existing in a traceably moving direction for tracing the reference route from a current location of the autonomous movable body, computes a traffic region formed by a traffic distance and at least a given traffic width not allowing the obstacle to intrude in each of a plurality of moving directions and decides a moving direction of the autonomous movable body on the basis of the traceably moving direction and the traffic region; and the speed decision means decides a moving speed allowing the autonomous movable body to stop before it corrodes with the obstacle in response to the breaking condition of the autonomous movable body and the location and the speed of the obstacle.

Further, in order to attain the above object, it is desirable that the route decision means: decides a route trace target point on the reference route on the basis of the location of the autonomous movable body; computes a trafficable distance of the traffic region in each of a plurality of directions at a given traffic width allowing the autonomous movable body to move; decides an obstacle avoidance target point on the basis of the length component of the trafficable distance in the route trace target point direction; computes a traffic region having an expanded traffic width on the basis of the direction of the obstacle avoidance target point; sets a traffic width expansion target point in the direction where the variation of the trafficable distance decreases and the traffic width having a given upper limit expands; and decides a moving direction of the autonomous movable body.

Further, in order to attain the above object, it is desirable that the memory information processing means records a value suitable for the traffic width of the autonomous movable body beforehand in accordance with a site and the route decision means adjusts narrow path running through performance by using the traffic width recorded by the memory information processing means as the traffic width when an obstacle avoidance target point is decided.

Further, in order to attain the above object, it is desirable that the route decision means adjusts route traceability by deciding an obstacle avoidance target point by a value obtained by multiplying the length of the trafficable distance in the direction of the straight line connecting the autonomous movable body to a route trace target point by a given coefficient when the obstacle avoidance target point is decided.

Further, in order to attain the above object, it is desirable that the route decision means adjusts route traceability and narrow path running through performance by, with regard to the length of a trafficable distance in the direction of the straight line connecting the autonomous movable body to the route trace target point and a trafficable width, deciding a traffic width expansion target point by a value obtained by adding the two values in the same direction or a value obtained by adding values each of which is obtained by multiplying it by a given coefficient when the traffic width expansion target point is decided.

Further, in order to attain the above object, it is desirable that the obstacle detection means: converts the coordinate of a detected obstacle to a coordinate system not influenced by the movement of the autonomous movable body by the self-location information; computes a moving vector of the obstacle by obtaining locational difference from an obstacle obtained from past sensor information; and adjusts the moving vector of the obstacle to the moving speed of the obstacle envisioned in the safety speed calculation field of the speed decision means.

Further, in order to attain the above object, it is desirable that the obstacle detection means: has a function of identifying whether a detected obstacle is a human, a child, or an adult from the shape and picture information; and adjusts the value of the moving speed of the obstacle envisioned in the safety speed calculation of the speed decision means.

Further, in order to attain the above object, it is desirable that the safety speed calculation field of the speed decision means adjusts the upper limit of the speed of the autonomous movable body or the envisioned moving speed of an obstacle in response to the angle of corrosion when the obstacle moves at an envisioned speed and approaches the autonomous movable body.

Further, in order to attain the above object, it is desirable that the speed decision means decides a speed of the autonomous movable body by computing point by point the speed of the autonomous movable body allowing to stop before corrosion occurs without using a safety speed calculation field when an obstacle approaches at an envisioned speed in consideration of the breaking condition of the autonomous movable body in response to the location of the obstacle.

Further, in order to attain the above object, it is desirable that, in the autonomous movable body, the route decision means and the speed decision means are configured so as to be independent processes in a computer and the processing cycles are set individually.

Advantageous Effects of Invention

The present invention makes it possible to provide an autonomous movement system capable of moving safely and swiftly in an environment including a narrow path and a moving obstacle.

DESCRIPTION OF EMBODIMENTS

An autonomous movement system according to an embodiment of the present invention is explained hereunder in reference to drawings.

First Embodiment

The present embodiment is the case of autonomously running through a reference route specified on a map with a self-location estimated in an environment of a facility or a town where an object such as a pedestrian or an obstacle exists. On the occasion, it is possible to: weave at a safety speed in a narrow space; and run at a high speed apart from an ambient pedestrian in order to secure safety in a large space. An example of an autonomous movement system having both safety and swiftness and allowing a vehicle to run at a speed at which the vehicle can stop before collision occurs when a pedestrian approaches is explained.

Figure 1:
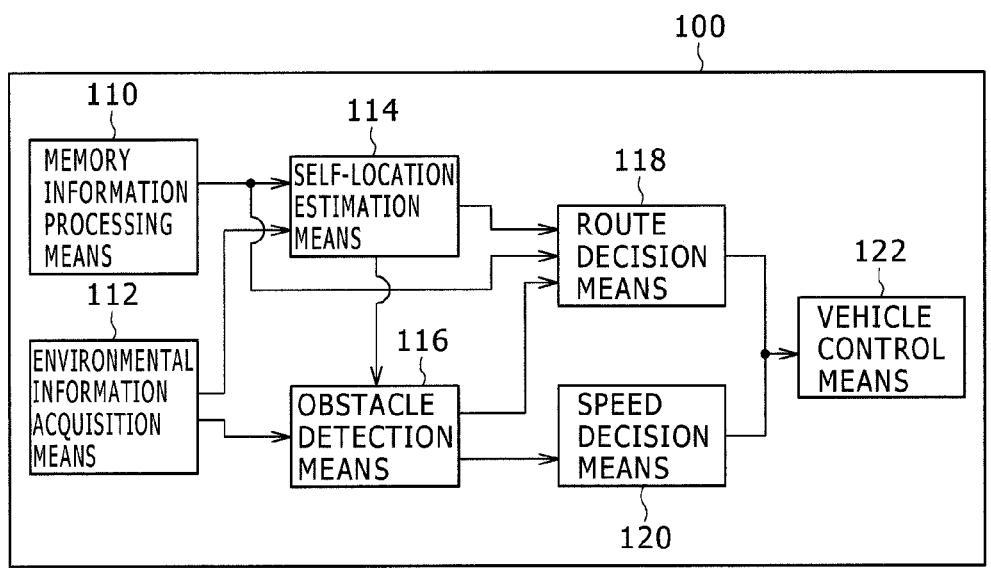
FIG. 1 is a schematic configuration diagram of an autonomous movement system according to a first embodiment of the present invention.

FIG. 1 is a schematic configuration diagram of an autonomous movement system according to the first embodiment of the present invention.

Figure 2:
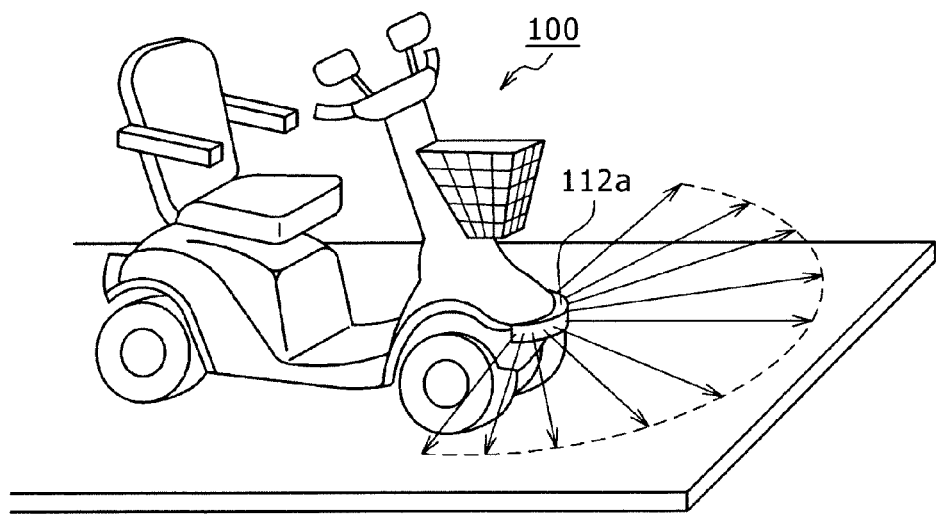
FIG. 2 is a view explaining a sensor mounted on an autonomous movable body according to the first embodiment.

FIG. 2 is a view explaining a sensor mounted on an autonomous movable body according to the first embodiment.

In FIG. 1, an autonomous movable body 100 comprises a memory information processing means 110, an environmental information acquisition means 112, a self-location estimation means 114, an obstacle detection means 116, a route decision means 118, a speed decision means 120, and a vehicle control means 122. Here, although it is not shown in the figure, either the above means may be configured so as to be carried out on a computer mounted on the autonomous movable body 100 or some or all of the above means may be configured so as to be carried out on an external computer by using wireless communication.

An autonomous movable body according to the present embodiment explained hereunder is configured so as to move with wheels.

The memory information processing means 110: at least retains a reference route through which the autonomous movable body 100 runs and a landmark (landmark information obtained from the shape of a building or trees, an image, magnetism, or the shape of a road) existing around the route; transmits the information of the landmark around the route to the self-location estimation means 114; and transmits the reference route to the route decision means 118.

The environmental information acquisition means 112 shown in FIG. 1 comprises a sensor mounted on the autonomous movable body 100 and obtains information from the sensor. The sensor is not specifically shown in the figure but comprises a laser-type distance sensor, a camera, an angular velocity sensor, an acceleration sensor, a magnetic sensor, a GPS receiver, a wheel rotation rate sensor, etc.

The self-location estimation means 114 specifies the current location of the autonomous movable body 100 on the basis of the information obtained from the sensors. In detail for example, the self-location estimation means 114 estimates accurate self-location and direction in a region where the autonomous movable body 100 moves by stochastically integrating (for example, by adopting a means called an extended Kalman filter): self-location information (called odometry) created by accumulating the value of the wheel rotation rate sensor; the correction by odometry with an angular velocity sensor, an acceleration sensor, and a magnetic sensor; self-location information (self-location by matching) obtained by matching information obtained from a laser-type distance sensor and a camera to landmark information obtained from the memory information processing means 110; and self-location information obtained from a GPS receiver (self-location obtained by a GPS).

The finally obtained self-location is transmitted to the obstacle detection means 116 and the route decision means 118 described below. Here, in self-location information and the like, a latitude-longitude coordinate system, a coordinate system based on a sensor, and a coordinate system of a route used as the reference of running are arranged so as to be handled as an identical coordinate system by converting the coordinate on the basis of the relationship of location and posture between coordinate systems.

The obstacle detection means 116 detects a region interfering with the movement of the autonomous movable body 100 on the basis of the sensor information. In detail for example, in ambient shape information obtained from a laser-type distance sensor and a camera (such as a stereo camera system configured by arraying two cameras so as to be able to measure a distance), a bump of a height which the autonomous movable body 100 cannot run over, a large trench, a projection in the air, etc. fall under the category of an obstacle. Further, the obstacle detection means 116 also detects a moving obstacle such as a pedestrian or a bicycle existing in an environment of a facility or a town intended by the present invention.

For example, as shown in FIG. 2, environmental information of a traveling direction is obtained with a laser radar 112a attached in the center of the lower part of the front face of the autonomous movable body 100 as a vehicle (vehicle body). The laser radar 112a scans a running floor horizontally in the anterior direction of the vehicle body at given intervals and detects the distance from an obstacle existing in front of the vehicle body to the vehicle and the size of the obstacle.

The environmental information detected by the laser radar 112a is transmitted to the self-location estimation means 114 and the obstacle detection means 116 described below.

The route decision means 118 decides the target direction of the autonomous movable body 100 on the basis of the self-location information, the running reference route, the type of the obstacle (a pedestrian, a bicycle, moving or not, a bump, etc.) detected by the obstacle detection means, and obstacle information such as a location and a shape. Through the procedure described below, the route decision means 118: decides a moving direction in consideration of the traceability to the reference route, the avoidability of an obstacle, and the safety of traffic location; and transmits it to the vehicle control means 122.

The speed decision means 120 decides a target speed of the autonomous movable body 100 on the basis of the obstacle information. Through the procedure described below, the speed decision means 120: decides a moving speed capable of stopping before collision with an obstacle occurs while envisioning the movement of the ambient obstacle; and transmits it to the vehicle control means 122. In order to secure swiftness and safety that are the problems of the present invention, it is necessary to: decide the speed of the vehicle in response to the on-site situation; and implement the speed decision means 120 independently from the processing of the route decision means 118 (the processing cycle may be different).

The vehicle control means 122 controls the movement of the vehicle by the target direction and the target speed of the autonomous movable body 100 obtained from the route decision means 118 and the speed decision means 120 respectively. Specifically for example, the vehicle control means 122 controls so that the difference between the current moving direction and moving speed of the autonomous movable body 100 and the target direction and target speed thereof may be small. Further, the vehicle control means 122 has a motor and an electronic circuit for controlling wheels and can change the location and direction of the autonomous movable body 100.

Figure 3:
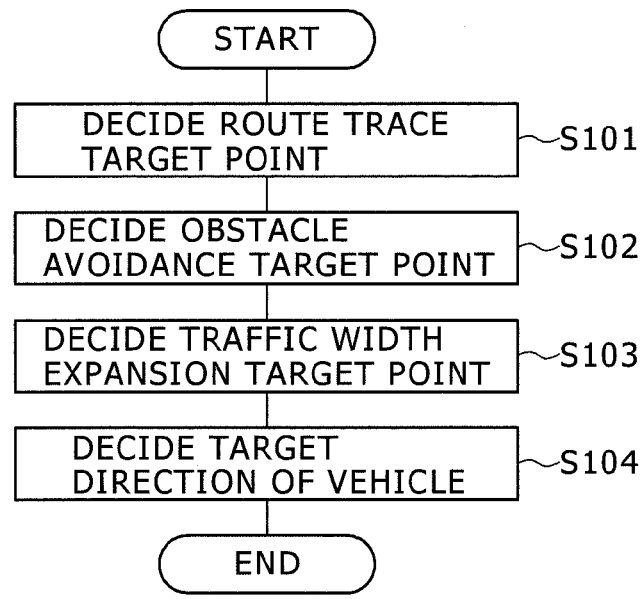
FIG. 3 is a flowchart explaining the process of a route decision means according to the first embodiment.

FIG. 3 is a flowchart explaining the process of a route decision means according to the first embodiment.

Figure 4:
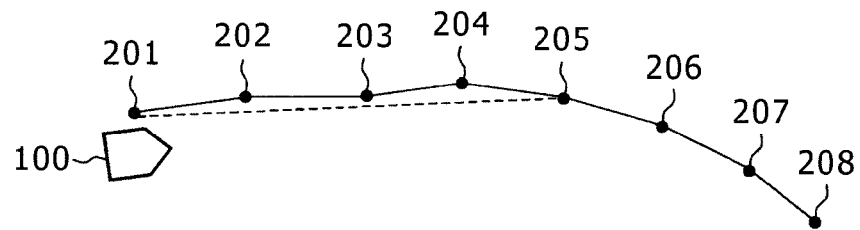
FIG. 4 is a conceptual view explaining the decision of a route trace target point according to the first embodiment.
Figure 5:
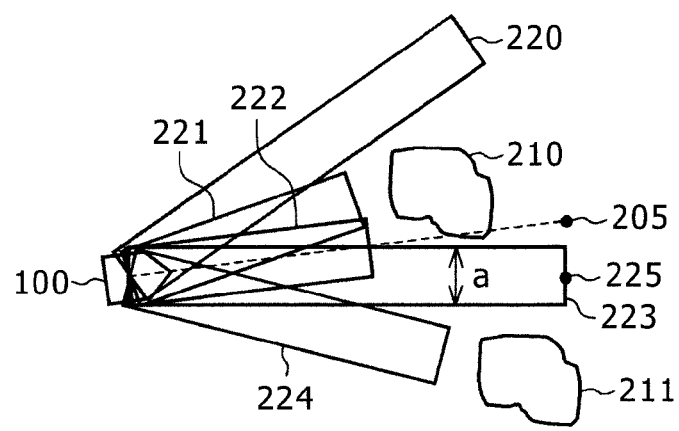
FIG. 5 is a conceptual view explaining the decision of an obstacle avoidance target point according to the first embodiment.
Figure 6:
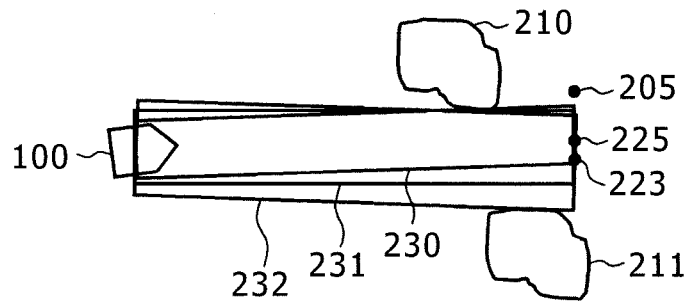
FIG. 6 is a conceptual view explaining the decision of a traffic width expansion target point according to the first embodiment.

The processes of the blocks in the flowchart shown in FIG. 3 are explained in FIGS. 4, 5 and 6, respectively.

FIG. 4 is a conceptual view explaining the decision of a route trace target point according to the first embodiment.

FIG. 5 is a conceptual view explaining the decision of an obstacle avoidance target point according to the first embodiment.

FIG. 6 is a conceptual view explaining the decision of a traffic width expansion target point according to the first embodiment.

In FIGS. 3, 4, 5, and 6, the route decision means 118 firstly decides a route trace target point at the step S101 in FIG. 3.

As shown in FIG. 3, processes are carried out on the basis of the self-location information and the reference route. The reference route is given as the points of given intervals such as the reference route points 201 to 208 shown in FIG. 4 (a point is connected to a next point with a line so that the sequence can be recognized).

In FIG. 4, the autonomous movable body 100 is regarded as having already reached the reference route point 201. In the trace to the reference route, traceability and convergence vary in response to what location is to be a target. It is possible to increase the convergence to a route by setting a route trace target point as remotely as possible but the autonomous movable body 100 moves far inside the route at a curved route because the traceability is low. For the reason, it is desirable to secure the traceability to a route by setting a route trace target point close even though the convergence is sacrificed.

Consequently, a route trace target point is decided through the following procedure in order to set the route trace target point distantly in the case of a straight line and close in the case of a curved line.

The line ranging from the point 201 to the point 205 is regarded as a straight line when the maximum value (here, the distance between the point 204 and the dotted line) of the distances between the straight line connecting the point 201 to the point 205 shown with the dotted line in FIG. 3 and the respective points 202 to 204 that are intermediate points is less than a threshold value. Further, although it is not shown in the figure, when intermediate points exist on the right and left sides of the dotted line, the maximum value of the distances between intermediate points on each of the right and left sides and the dotted line is derived and it is confirmed that the sum is less than a threshold value. This process is applied to reference route points from the near side to the remote side in the sequence of the straight line connecting the point 201 to the point 203, the straight line connecting the point 201 to the point 204, and then the straight line connecting the point 201 to the point 205 and the point immediately before they are not regarded as a straight line is decided as a reference route trace target point (the point 205 is regarded as a route trace target point hereunder).

By deciding a route trace target point through the above procedure, it is possible to move through a stable route having a small curvature because the distance to the route trace target point increases when a straight line is anticipated in the event of tracing a reference route and the moving location does not excessively come to the inside of the route because the distance to the route trace target point decreases when a curved line is anticipated.

Here, in the judgment on what reference route point the autonomous movable body 100 reaches, the autonomous movable body 100 is regarded as reaching a next reference route point on a reference route by confirming that the location of the autonomous movable body 100 is within a given distance from the next reference route point (the point 202 in FIG. 3) and the location of the autonomous movable body 100 exceeds lines perpendicular to the straight line(s) connecting the point 202 to one or both of the reference route points (the points 201 and 203 in FIG. 3) before and after the point 202. The autonomous movable body 100 in FIG. 3 does not exceed the point 202 and hence is in the state of having reached the point 201 now.

The effect of evading an obstacle from a long distance is obtained by deciding a route trace target point through the above procedure and hence the whole route length decreases and swiftness increases accordingly.

The route decision means 118 secondly decides an obstacle avoidance target point at the step S102 in FIG. 3.

As shown in FIG. 5, process is carried out on the basis of the self-location information, the route trace target point 205, and obstacles 210 and 211. A candidate route of the autonomous movable body 100 is represented by a rectangle and a distance (it means the length of the rectangle and is called a trafficable distance hereunder) runnable at a traffic width (the rectangle width a in FIG. 4) required minimally for the running of the autonomous movable body 100 is computed for each of given angular intervals. The trafficable distance is the maximum length not containing an obstacle inside and not exceeding the distance to the route trace target point 205. Here, when the distance to the route trace target point 205 is short, it is also possible to set a distance at which at least an obstacle can be avoided by adopting another given value as the upper limit of the trafficable distance.

Under the condition shown in FIG. 5 for example, the candidate routes at the minimum traffic width are obtained as the rectangles 220 to 224 (a search angle range and search angular intervals are decided as needed). The straight line represented by the dotted line in the figure connecting the autonomous movable body 100 to the route trace target point 205 is used as the reference (zero degree), the lengths of the rectangles 220 to 224 in the direction of the straight line as the trafficable distances are obtained with a cosine function (cosine), and the tip of the rectangle having the maximum length (the rectangle 223 in FIG. 4) is decided as an obstacle avoidance target point 225. The obstacle avoidance target point 225 is the farthest point to which the autonomous movable body 100 can advance in the direction of the route trace target point 205.

By deciding an obstacle avoidance target point through the above procedure, it is possible to: select a narrow path by using a traffic width minimally required to run the autonomous movable body 100; reduce the possibility of coming to a dead end by selecting the direction where the autonomous movable body 100 can advance to the farthest point in the direction of the route trace target point 205; and enhance safety and swiftness by selecting the direction where the route does not windingly curve and the autonomous movable body 100 can advance straight.

The route decision means 118 successively decides a traffic width expansion target point at the step S103 in FIG. 3. As shown in FIG. 6, rectangles 230 to 232 are obtained as rectangles having a length identical to the trafficable distance obtained in FIG. 5 and having the maximum widths not containing an obstacle inside as trafficable widths. Here, although it not shown in the figure, a search angle range and search angular intervals are decided as needed. The trafficable width is increased up to an upper limit described below in the right and left directions by using the direction of the obstacle avoidance target point 225 as a starting point and a rectangle the trafficable distance of which does not reduce (less than a threshold value) is searched.

The tip of a rectangle either in the direction closest to the direction of the obstacle avoidance target point 225 in the rectangles the trafficable distances of which have reached the upper limit or in the direction allowing the maximum trafficable width in the case where there is no rectangle that reaches the upper limit among the rectangles satisfying the above condition is defined as a traffic width expansion target point 233 (the tip of the rectangle 231 at the trafficable width in FIG. 6).

By deciding an obstacle avoidance target point through the above procedure, it is possible to run through a location of a higher degree of safety in response to the size of a space while a narrow route is selected at a narrow path. In addition, in the case of being sufficiently safe, swiftness improves by selecting a shorter route. Here, the upper limit of the trafficable width is set at not less than the distance separating the autonomous movable body 100 from an obstacle in the right and left directions when the autonomous movable body 100 moves at an upper limit speed in the speed decision means 120 that will be explained in detail later.

Here, the decision of the route trace target point, the obstacle avoidance target point, and the traffic width expansion target point described above is only an example to solve the problems of the present invention and it is possible to obtain them by thorough search of using a trafficable distance and a traffic width as the parameters or it is possible to: compute a route of a vehicle having a narrow traffic width in a narrow path or an environment of densely existing obstacles; and compute a route having a wide traffic width in a wide environment where an obstacle is located distantly. Further, in order to secure swiftness, any method can be adopted as long as the method can design a route that does not bend and can advance up to a long distance without being interfered with an obstacle or the like.

The route decision means 118 finally decides the direction of the straight line connecting the autonomous movable body 100 to the traffic width expansion target point 233 as the target direction of the vehicle at the step S104 in FIG. 3 and transmits it to the vehicle control means 122.

Figure 7:
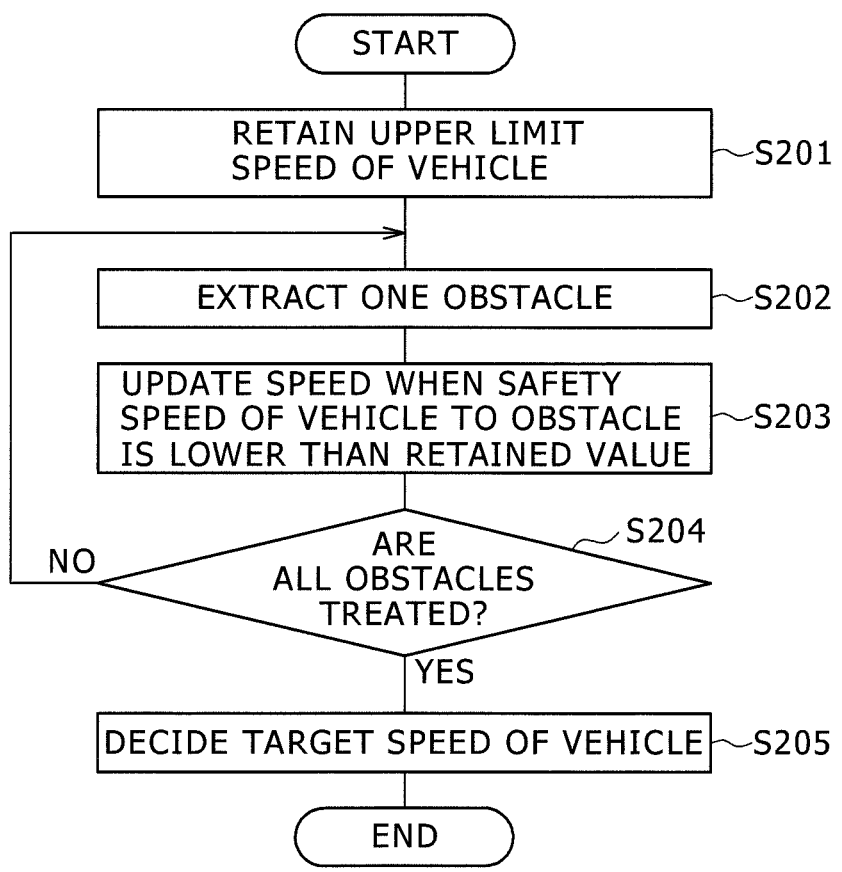
FIG. 7 is a flowchart explaining the process of a speed decision means according to the first embodiment.

FIG. 7 is a flowchart showing the process of the speed decision means 120 shown in FIG. 1.

In FIG. 7, as one example of a speed decision means securing safety so as to be able to stop when an obstacle runs out and enabling swift running, a method of deciding a speed considering the break condition of a vehicle in response to obstacle information (type, location, speed, etc.) is explained.

The speed decision means 120: has a region of retaining a target speed value inside although it is not shown in the figure; updates the value in a flowchart; and sets the finally retained speed as the target speed of a vehicle. Firstly, the upper limit speed of a vehicle is retained at the step S201. The upper limit speed is a value decided in accordance with the running location and running performance of the autonomous movable body 100. Successively, the location of an obstacle (or a point group constituting an obstacle) detected around the vehicle is extracted at the step S202. Successively, a speed of the vehicle allowable to the extracted obstacle is derived through the procedure described below and the retained speed is overwritten with the speed and updated when the speed is lower than the retained speed at the step S203. Successively at the step S204, whether or not the processes are applied to all the obstacles is confirmed, the process goes back to the step S202 when an unprocessed obstacle remains, and the process shifts to the step S205 when no unprocessed obstacle remains. Finally, the speed retained after all the obstacles are processed is defined as the target speed of the vehicle at the step 205 and is transmitted to the vehicle control means 122.

Figure 8:
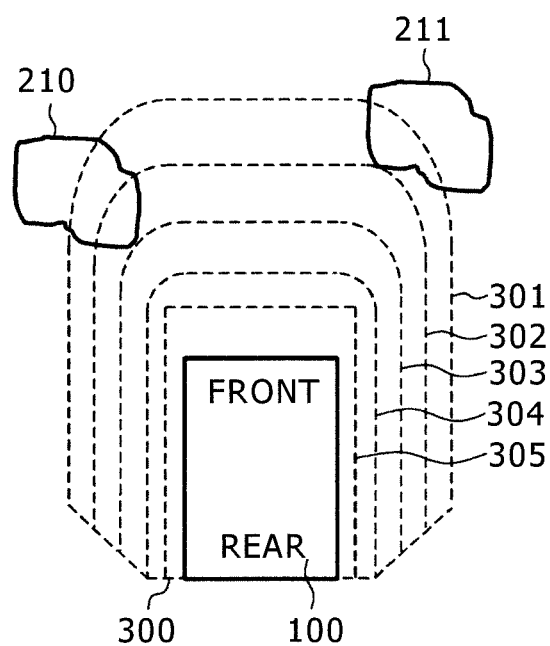
FIG. 8 is a conceptual view of a safety speed calculation field according to the first embodiment.

The process carried out at the step S203 of the flowchart is explained in detail in reference to FIG. 8.

FIG. 8 is a conceptual view of a safety speed calculation field according to the first embodiment of the present invention.

In FIG. 8, for example a method of previously preparing the relation of the speed of the autonomous movable body 100 to the location of an obstacle like a safety speed calculation field 300 (the contour lines are 301 to 305) is used. The role of the safety speed calculation field 300 is to stop the autonomous movable body 100 before it collides with an obstacle. A speed allowing the autonomous movable body 100 to decelerate at an acceleration a (m/s$^2$) and stop before it collides on the assumption that an obstacle moves at a speed v (m/s) at the most is computed with the expressions 1 and 2.

[Numerical expression 1]

$$X_R = \frac{1}{2}at^2, Y_R = 0 \quad \text{(Expression 1)}$$

[Numerical expression 2]

$$(X_O-X_G)^2+(Y_O-Y_G)^2=(vt)^2 \quad \text{(Expression 2)}$$

Expression 1 represents movement when the shape of the autonomous movable body 100 is regarded as a point and means that the autonomous movable body 100 moves from an original point and reaches $(X_R, Y_R)$ at an acceleration a at time t.

Expression 2 represents the movement of an obstacle and means that the obstacle existing at an arbitrary grid location $(X_G, Y_G)$ reaches a circle formed by $(X_O, Y_O)$ at time t when the obstacle moves at a speed v in an arbitrary direction.

The time of collision can be identified by obtaining t satisfying the expressions $X_O=X_R$ and $Y_O=Y_R$. The speed at the time t is an allowable speed. Although the autonomous movable body 100 shifts from an arbitrary speed to a stopped state actually, it is only necessary to compute the condition of being accelerated from the stopped state and colliding. Here, the speed v of the obstacle is set at a value of 4 to 6 km/h in the case of a pedestrian for example. The acceleration a of the autonomous movable body 100 is set at 0.2 G (1.96 m/s$^2$) for example and may be changed in accordance with the existence of a passenger, the physical condition of a passenger on the autonomous movable body 100, and the setting of a passenger. Through the above procedure, it is possible to compute an allowable speed to an ambient obstacle in the case where the autonomous movable body 100 is represented by a point.

Successively, an allowable speed used at the step S203 is computed on the basis of the shape of the autonomous movable body 100, a minimum separable distance between the autonomous movable body 100 and an obstacle, and the condition of collision.

Firstly, a minimum separable distance between the autonomous movable body 100 and an obstacle is specified. For example, a minimum separable distance is set at a relatively large value of 1 m in the front direction because the autonomous movable body 100 approaches in the direction and is set at a relatively small value of 0.1 m in the side direction. The value of the safety speed calculation field 300 is decided by regarding the allowable speed to an obstacle as zero in the inside of the autonomous movable body 100 and in the range of the minimum separable distance from the obstacle. In the case of the outside thereof, a value obtained by extending the value of the allowable speed obtained by regarding the shape of the autonomous movable body 100 as a point is used.

Specifically for example, the values obtained in the anterior and posterior directions are extended in the right and left directions respectively in the case of regarding the shape as a point with regard to the anterior and posterior directions of the autonomous movable body 100 and the values obtained in the side directions are extended in the anterior and posterior directions in the case of regarding the shape as a point with regard to the side directions. The length of the extension is a value obtained by adding the shape of the autonomous movable body 100 and the minimum separable distance from an obstacle. Finally, in the case where an obstacle collides with the autonomous movable body 100 at an angle not less than a given angle from the posterior side, it is possible to set an allowable speed at a value larger than the upper limit at the step S201 or a value computed through Expressions 1 and 2 with the aim of preventing collision. Through the above procedure, in the case where the autonomous movable body 100 has a rectangular shape, the safety speed calculation field 300 is obtained as a field of a contour line (lines obtained by connecting identical speeds) type as represented by the numerals 300 to 305 in FIG. 7. Here, the allowable speed is large at the contour line of 301 and reduces in the sequence of 302, 303, and then 304. Here, the allowable speed is zero at the contour line of 305.

By deciding a target speed through the above procedure, the autonomous movable body 100: moves swiftly because it moves at the upper limit speed in a large space where no obstacle exists around the circumference; can pass through a narrow path safely by running at a reduced speed; and can run safely because the autonomous movable body 100 stops before collision occurs when a moving obstacle approaches at an envisioned speed or less.

Further, in the case where an obstacle runs out from a concealed place too, a high degree of safety is obtained because a speed is controlled in accordance with the locational relationship with the concealed place when the autonomous movable body 100 runs through the concealed place. By the present means further, it is possible to avoid an obstacle and restart the movement after the autonomous movable body 100 goes back by using a safety speed calculation field for backward movement even after the obstacle approaches and once the autonomous movable body 100 stops and run by using a safety speed calculation field allowing the autonomous movable body 100 to move at a sufficiently low speed as long as contact is avoided when an obstacle stands still, thus the safety speed calculation field also changes in accordance with the change of obstacle information, and hence the autonomous movable body 100 never comes to be immovable.

The speed decision means 120 decides the finally retained speed as the target direction of a vehicle at the step S205 in FIG. 6 finally and transmits it to the vehicle control means 122.

Second Embodiment

Plural examples identical to the first embodiment of the present invention or different from the first embodiment for attaining the object more effectively are explained hereunder.

The plural examples are different from the first embodiment on the point described below, other points are basically identical to the first embodiment, and hence duplicating explanations are omitted.

The route decision means 118 shown in FIG. 1 changes the width of a rectangle representing a candidate route in accordance with a site when an obstacle avoidance target point is decided at the step S102 in FIG. 3.

Specifically for example, when the site through which the autonomous movable body 100 goes is known to be sufficiently large and it is desirable not to go through a particularly narrow site in a narrow route caused by an obstacle, the width of the rectangle is expanded so as to be wider than a traffic width minimally required for the running of the autonomous movable body 100. Further, at a site where a path is previously known to be narrow likewise, the width of the rectangle is reduced to the extent possible so as to make it easier to pass through a narrow route. By so doing, it is possible to appropriately adjust narrow path running through performance. The above function may be added to the first embodiment.

The route decision means 118, when an obstacle avoidance target point is decided at the step S102, defines the tip of the rectangle having the maximum value in the values obtained by multiplying the lengths obtained by projecting the rectangles 220 to 224 of the trafficable distances by using the straight line connecting the autonomous movable body 100 to the route trace target point 205 as a reference axis by a given coefficient as an obstacle avoidance target point. The given coefficient is obtained for example by setting the straight line connecting the autonomous movable body 100 to the route trace target point 205 at zero degree, using a Gauss function using an angle as a variable, and changing the standard deviation in response to conditions including a site. By so doing, it is possible to enhance route traceability in response to a site. The above function may be added to the first embodiment.

The route decision means 118, when a traffic width expansion target point is decided at the step S103, with regard to the lengths obtained by projecting the rectangles 220 to 224 of the trafficable distances by using the straight line connecting the autonomous movable body 100 to the route trace target point 205 as a reference axis and the widths of the rectangles 220 to 224 of the trafficable widths, defines the tip of the rectangle having the maximum value either in the values each of which is obtained by adding a length computed from an identical direction to a width or in the values each of which is obtained by adding a length obtained by multiplying a length by a given coefficient to a width obtained by multiplying a width by a given coefficient as a traffic width expansion target point. By so doing, it is possible to adjust route traceability and narrow path running through performance. The above function may be added to the first embodiment.

The obstacle detection means 116, with regard to a detected obstacle, computes a moving vector of the obstacle by: converting the coordinate to a coordinate system not influenced by the movement of the autonomous movable body 100 by the self-location information; and obtaining the difference of location from the obstacle obtained from past sensor information. Then the obstacle detection means 116 adjusts the value of the moving speed of the obstacle envisioned in the safety speed calculation field 300 of the speed decision means 120. Specifically, the moving speed envisioned for an obstacle getting away from the autonomous movable body 100 is decreased in response to the moving vector and the moving speed envisioned for an approaching obstacle is increased. By so doing, unnecessary deceleration is avoided and swiftness improves. The above function may be added to the first embodiment.

The obstacle detection means 116, with regard to a detected obstacle, has the function of identifying whether the obstacle is a human, a bicycle, an animal, a child, or an adult from the shape and image information. By the function, the value of the moving speed of an obstacle envisioned at the safety speed calculation field 300 of the speed decision means 120 is adjusted. Specifically, the envisioned moving speed is decreased in the case of an obstacle other than a human and is increased in the case where a human is a child. By so doing, safety improves. The above function may be added to the first embodiment.

At the safety speed calculation field 300 of the speed decision means 120, the upper limit of the speed of the autonomous movable body 100 is adjusted in response to the angle of collision when an obstacle moves at an envisioned speed and approaches the autonomous movable body 100. Specifically for example, adjustment is not carried out when an obstacle exists in front of the autonomous movable body 100 and the speed decided at the safety speed calculation field 300 is increased by multiplying the speed by a constant number or adding a constant number to the speed in the case where collision occurs diagonally from the front or collision occurs from a side. Further, it is also possible to materialize the similar function by reducing the envisioned moving speed of an obstacle. By so doing, swiftness improves by avoiding unnecessary deceleration with regard to collision of a small risk. The above function may be added to the first embodiment.

The speed decision means 120 is configured so as to use a method of sequentially carrying out calculation equivalent to the above calculation in accordance with the location of an obstacle even though the safety speed calculation field 300 is not prepared in advance. By so doing, although the amount of calculation for autonomous movement increases, it is possible to reduce the amount of data secured in a computer for example when you want to change the braking condition of the autonomous movable body 100 in response to the type and allocation condition of an obstacle or when you want to prepare a plurality of speeds that are envisioned for an obstacle (speeds envisioned as 4 to 6 km/h with the obstacle regarded as a pedestrian in the first embodiment) in comparison with the case of previously preparing a plurality of safety speed calculation fields 300. The above function may be added to the first embodiment.

In the configuration of the autonomous movable body 100, the route decision means 118 and the speed decision means 120 are configured as independent processes on a processing computer and the processing cycles are set individually. As a result, the processing cycle of the route decision means 118 is kept long and the processing cycle of the speed decision means 120 is kept short when the process for deciding a route by many evaluation standards comes to be enormous in the route decision means 118. By so doing, it is possible to obtain both the sophistication of route decision and the safety of speed decision. The first embodiment may be configured as follows.

Here, two or more of the functions may be added to the functions of the first embodiment.

Further, an autonomous movement system moving with wheels is exemplified as a configuration of an autonomous movable body 100 in the first embodiment but the present invention can be applied also to an autonomous movement system moving with legs. Furthermore, the present invention can be applied also to the configuration of providing some or all of the sensors constituting the environmental information acquisition means 112 outside an autonomous movable body 100 and coordinating with the autonomous movable body 100 by wireless communication.

As stated above, the present invention makes it possible to move safely and swiftly in response to an environment including a narrow path and a moving obstacle (size of a surrounding environment).

Further, the present invention makes it possible to: enhance route traceability in response to a site; and adjust the route traceability and narrow path running through performance.

Furthermore, the present invention makes it possible to: improve swiftness by eliminating unnecessary deceleration; thus secure a high degree of safety by eliminating unnecessary swiftness and improving swiftness in the case of collision of a low risk; and hence obtain both the sophistication of route decision and the safety of speed decision.

LIST OF REFERENCE SIGNS

100 Autonomous movable body
110 Memory information processing means
112 Environmental information acquisition means
114 Self-location estimation means
116 Obstacle detection means
118 Route decision means
120 Speed decision means
122 Vehicle control means
201 to 208 Reference route point (among them, 225 represents route trace target point)
220 to 224 Rectangle formed by minimum traffic width and trafficable distance
225 Obstacle avoidance target point
230 to 232 Rectangle formed by length of trafficable distance and trafficable width
233 Traffic width expansion target point
300 Safety speed calculation field (whole)
301 to 305 Site of an identical allowable speed at safety speed calculation field (contour line)

The invention claimed is:

1. An autonomous movement system having an environmental information acquisition means to acquire environmental information around an autonomous movable body,
   a memory information processing means to retain map information where a reference route is registered,
   a self-location estimation means to estimate the self-location of the autonomous movable body on the basis of the environmental information and the map information,
   an obstacle detection means to detect information on an obstacle on the basis of the environmental information,
   a route decision means to decide a moving direction on the basis of the self-location, the information on the obstacle, and information on the reference route,
   a speed decision means to decide a moving speed on the basis of the obstacle information,
   and a vehicle control means to control the movement of the autonomous movable body on the basis of the moving direction and the moving speed, wherein:
   the route decision means, in order to avoid the obstacle existing in a traceably moving direction for tracing the reference route from a current location of the autonomous movable body, computes a traffic region formed by a traffic distance and at least a given traffic width not allowing the obstacle to intrude in each of a plurality of moving directions and decides a moving direction of the autonomous movable body on the basis of the traceably moving direction, the traffic region, and an obstacle type, the obstacle type being detected by the obstacle detection means, and
   the speed decision means decides a moving speed allowing the autonomous movable body to stop before it collides with the obstacle in response to a braking condition of the autonomous movable body and the location and the speed of the obstacle.

2. An autonomous movement system according to claim 1, wherein the route decision means:
   decides a route trace target point on the reference route on the basis of the location of the autonomous movable body;
   computes a trafficable distance of the traffic region in each of a plurality of directions at a given traffic width allowing the autonomous movable body to move;
   decides an obstacle avoidance target point on the basis of the length component of the trafficable distance in the route trace target point direction;
   computes a traffic region having an expanded traffic width on the basis of the direction of the obstacle avoidance target point;
   sets a traffic width expansion target point in the direction where the variation of the trafficable distance decreases and the traffic width having a given upper limit expands; and
   decides a moving direction of the autonomous movable body.

3. An autonomous movement system according to claim 1, wherein the memory information processing means records a value suitable for the traffic width of the autonomous movable body beforehand in accordance with a site and the route decision means adjusts narrow path running through performance by using the traffic width recorded by the memory information processing means as the traffic width when an obstacle avoidance target point is decided.

4. An autonomous movement system according to claim 1, wherein the route decision means adjusts route traceability by deciding an obstacle avoidance target point by a value obtained by multiplying the length of the trafficable distance in the direction of the straight line connecting the autonomous movable body to a route trace target point by a given coefficient when the obstacle avoidance target point is decided.

5. An autonomous movement system according to claim 1, wherein the route decision means adjusts route traceability and narrow path running through performance by, with regard to the length of a trafficable distance in the direction of the straight line connecting the autonomous movable body to the route trace target point and a trafficable width, deciding a traffic width expansion target point by a value obtained by adding the two values in the same direction or a value obtained by adding values each of which is obtained by multiplying it by a given coefficient when the traffic width expansion target point is decided.

6. An autonomous movement system according to claim 1, wherein the obstacle detection means: converts the coordinate of a detected obstacle to a coordinate system not influenced by the movement of the autonomous movable body by the self-location information; computes a moving vector of the obstacle by obtaining locational difference from an obstacle obtained from past sensor information; and adjusts the moving vector of the obstacle to the moving speed of the obstacle envisioned in the safety speed calculation field of the speed decision means.

7. An autonomous movement system according to claim 6, wherein the safety speed calculation field of the speed decision means adjusts the upper limit of the speed of the autonomous movable body or the envisioned moving speed of an obstacle in response to the angle of collision when the obstacle moves at an envisioned speed and approaches the autonomous movable body.

8. An autonomous movement system according to claim 1, wherein the obstacle detection means:
   has a function of identifying whether a detected obstacle is a human, a child, or an adult from the shape and picture information; and
   adjusts the value of the moving speed of the obstacle envisioned in the safety speed calculation of the speed decision means.

9. An autonomous movement system according to claim 1, wherein the speed decision means decides a speed of the autonomous movable body by computing point by point the speed of the autonomous movable body allowing to stop before collision occurs without using a safety speed calculation field when an obstacle approaches at an envisioned speed in consideration of the breaking condition of the autonomous movable body in response to the location of the obstacle.

10. An autonomous movement system according to claim 1, wherein, in the autonomous movable body, the route decision means and the speed decision means are configured so as to be independent processes in a computer and the processing cycles are set individually.

* * * * *